(12) United States Patent
Kumar et al.

(10) Patent No.: US 11,049,339 B2
(45) Date of Patent: Jun. 29, 2021

(54) METHOD AND SYSTEM FOR VALIDATING ODOMETER PERFORMANCE IN AN AUTONOMOUS VEHICLE IN REAL-TIME

(71) Applicant: Wipro Limited, Bangalore (IN)

(72) Inventors: Balaji Sunil Kumar, Karnataka (IN); Manas Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 293 days.

(21) Appl. No.: 16/370,321

(22) Filed: Mar. 29, 2019

(65) Prior Publication Data
US 2020/0312057 A1 Oct. 1, 2020

(30) Foreign Application Priority Data
Mar. 29, 2019 (IN) .............................. 201941012470

(51) Int. Cl.
*G07C 5/08* (2006.01)
*G01C 22/02* (2006.01)
(Continued)

(52) U.S. Cl.
CPC ....... *G07C 5/0808* (2013.01); *G01C 21/3407* (2013.01); *G01C 22/02* (2013.01);
(Continued)

(58) Field of Classification Search
CPC ...... G07C 5/0808; G07C 5/085; G01C 22/02; G01C 21/3407; G05D 2201/0213; G05D 1/0088

See application file for complete search history.

(56) References Cited

U.S. PATENT DOCUMENTS

| 5,402,365 A | * | 3/1995 | Kozikaro | ............. G01C 22/025 701/1 |
| 2007/0244640 A1 | * | 10/2007 | Hirokawa | .............. G05D 1/024 701/480 |
| 2020/0225363 A1 | * | 7/2020 | Samii | ..................... G01S 19/23 |

FOREIGN PATENT DOCUMENTS

CN 108759823A A 11/2018

OTHER PUBLICATIONS

He X., et al., "Vision/Odometer Autonomous Navigation Based on RatSLAM for Land Vehicles", College of Mechatronics and Automation, National University of Defense Technology, Changsha, 410073, China, International Conference of Advances in Mechanical Engineering and Industrial Informatics (AMEII), published by Atlantis Press 2015, pp. 695-699.

* cited by examiner

*Primary Examiner* — Russell Frejd
(74) *Attorney, Agent, or Firm* — Finnegan, Henderson, Farabow, Garrett & Dunner, LLP

(57) ABSTRACT

The present disclosure discloses a method and an Electronic Control Unit (ECU) of autonomous vehicle for validating odometer performance in real-time. The method includes initiating navigation of the autonomous vehicle through a planned path on receipt of a source input and a destination input on a map. A first landmark at a first distance and a first viewing angle and a second landmark at a second distance and second viewing angle is detected from a current position of the autonomous vehicle. A first stored record corresponding to the first landmark based on a first distance match and a second stored record corresponding to the second landmark based on a second distance match is identified. The current position and a next consecutive position of the autonomous vehicle is determined. Reading of the odometer is validated with distance covered by the autonomous (Continued)

vehicle measured between the current position and the consecutive position.

13 Claims, 6 Drawing Sheets

(51) Int. Cl.
  *G01C 21/34* (2006.01)
  *G05D 1/00* (2006.01)
(52) U.S. Cl.
  CPC ........... *G07C 5/085* (2013.01); *G05D 1/0088* (2013.01); *G05D 2201/0213* (2013.01)

| AUTONOMOUS VEHICLE (X, Y) POSITION | FIRST LANDMARK (X, Y) POSITION | FIRST LANDMARK DISTANCE | FIRST LANDMARK VIEWING ANGLE | SECOND LANDMARK (X, Y) POSITION | SECOND LANDMARK DISTANCE | SECOND LANDMARK VIEWING ANGLE |
|---|---|---|---|---|---|---|
| | | | | | | |
| | | | | | | |
| | | | | | | |

METHOD AND SYSTEM FOR VALIDATING ODOMETER PERFORMANCE IN AN AUTONOMOUS VEHICLE IN REAL-TIME

TECHNICAL FIELD

The present subject matter is related in general to autonomous vehicles, more particularly, but not exclusively to a method and system for validating odometer performance in an autonomous vehicle in real-time.

BACKGROUND

Autonomous driving technology has grown rapidly in recent times in order to meet changing demands of society. An autonomous vehicle typically estimates its changing position while navigating in an environment. Along with environment observation, the autonomous vehicle also takes into account change in (x, y) position as input to probabilistically determine a new position of the autonomous vehicle. Such change in the (x, y) position of the autonomous vehicle is sensed by odometer reading. Odometer is one such sensor that provides a measure of position shift of the autonomous vehicle during navigation, from a start position. Hence, the odometer reading plays an important role in vehicle navigation and thereby requires its reliability of functioning to be constantly monitored.

Further, there are multiple types of odometer, for instance a wheel based odometer, a lidar based odometer, and the like. Different types of odometer usage lead to different types of methods to determine vehicle position on a map. However, existing solutions only determine an exact position of the autonomous vehicle and not validity of position input by the odometer in real-time.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to method of validating odometer performance in an autonomous vehicle. The method includes initiating, by an electronic control unit (ECU), navigation of the autonomous vehicle through a planned path on receipt of a source input and a destination input on a map. The method includes detecting a first landmark at a first distance and a first viewing angle and a second landmark at a second distance and second viewing angle from a current position of the autonomous vehicle on the planned path based on camera observation. Further, the method includes identifying a first stored record corresponding to the first landmark based on a first distance match and a second stored record corresponding to the second landmark based on a second distance match. The method includes determining the current position of the autonomous vehicle on the map based on the first distance, the first viewing angle, the second distance, the second viewing angle, the first stored record and the second stored record. Thereafter, the method includes determining a next consecutive position of the autonomous vehicle on the map, and validating reading of the odometer with distance covered by the autonomous vehicle measured between the current position and the consecutive position.

In an embodiment, the present disclosure may relate to an Electronic Control Unit (ECU) of an autonomous vehicle for validating odometer performance in an autonomous vehicle in real-time. The ECU may include a processor and a memory communicatively coupled to the processor, where the memory stores processor executable instructions, which, on execution, may cause the ECU to initiate navigation of the autonomous vehicle through a planned path on receipt of a source input and a destination input on a map. The ECU detects a first landmark at a first distance and a first viewing angle and a second landmark at a second distance and second viewing angle from a current position of the autonomous vehicle on the planned path based on camera observation. Further, the ECU identifies a first stored record corresponding to the first landmark based on a first distance match and a second stored record corresponding to the second landmark based on a second distance match. The ECU determines the current position of the autonomous vehicle on the map based on the first distance, the first viewing angle, the second distance, the second viewing angle, the first stored record and the second stored record. Thereafter, the ECU determines a next consecutive position of the autonomous vehicle on the map, and validates reading of the odometer with distance covered by the autonomous vehicle measured between the current position and the consecutive position.

In an embodiment, the present disclosure relates to a non-transitory computer readable medium including instructions stored thereon that when processed by at least one processor may cause an Electronic Control unit (ECU) of an autonomous system to validate odometer performance in real-time. The instructions causes the processor to detect a first landmark at a first distance and a first viewing angle and a second landmark at a second distance and second viewing angle from a current position of the autonomous vehicle on the planned path based on camera observation. The instruction causes the processor to identify a first stored record corresponding to the first landmark based on a first distance match and a second stored record corresponding to the second landmark based on a second distance match. Further, the instruction causes the processor to determine the current position of the autonomous vehicle on the map based on the first distance, the first viewing angle, the second distance, the second viewing angle, the first stored record and the second stored record. A next consecutive position of the autonomous vehicle is determined on the map. Thereafter, the instruction causes the processor to validate reading of the odometer with distance covered by the autonomous vehicle measured between the current position and the consecutive position.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
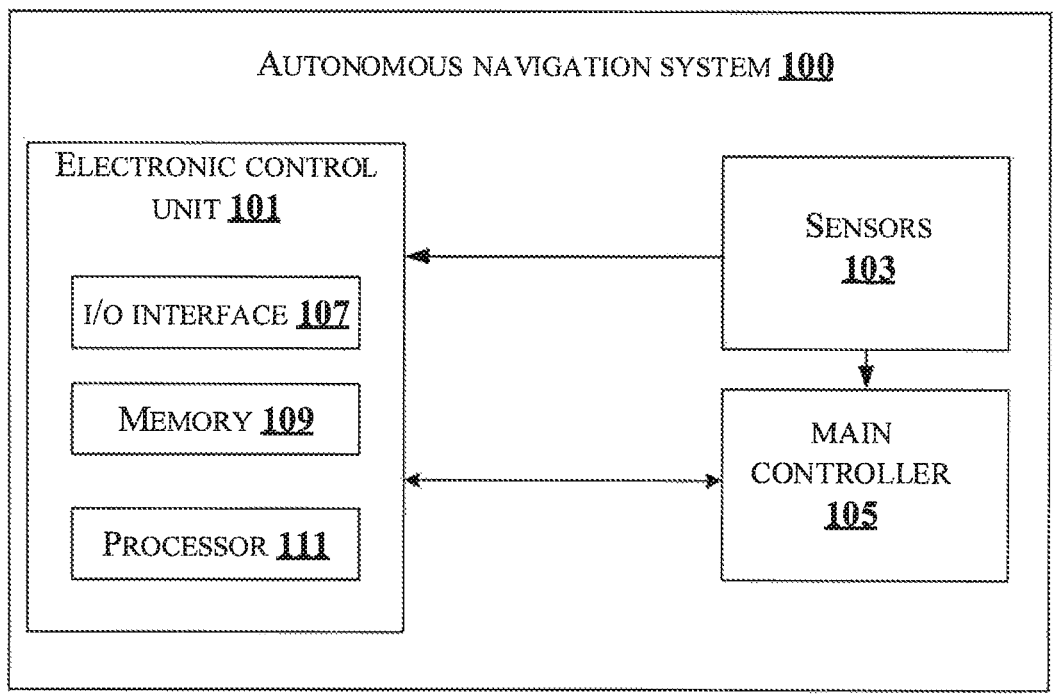
FIG. 1 illustrates an exemplary block diagram of an autonomous navigation system for validating odometer performance in an autonomous vehicle in real-time, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and an Electronic Control Unit (ECU) of an autonomous vehicle for validating odometer performance in the autonomous vehicle in real-time. In an embodiment, the autonomous vehicle refers to a driverless vehicle. The present disclosure utilizes existing available environment/infrastructure along a map to validate odometer performance in the autonomous vehicle in real-time. Sensors may be utilized for determining position of the autonomous vehicle in the environment. In an embodiment, navigation of the autonomous vehicle may be initiated through a planned path on receipt of a source input and a destination input on a map. A first landmark is detected at a first distance and a first viewing angle and a second landmark is detected at a second distance and second viewing angle from a current position of the autonomous vehicle on the planned path based on camera observation. Further, a first stored record corresponding to the first landmark is identified based on a first distance match and a second stored record corresponding to the second landmark is identified based on a second distance match. The current position of the autonomous vehicle is determined on the map based on the first distance, the first viewing angle, the second distance, the second viewing angle, the first stored record and the second stored record. Thereafter, a next consecutive position of the autonomous vehicle is determined on the map, and reading of the odometer is validated with distance covered by the autonomous vehicle measured between the current position and the consecutive position.

FIG. 1 illustrates an exemplary block diagram of an autonomous navigation system for validating odometer performance in an autonomous vehicle in real-time, in accordance with some embodiments of the present disclosure.

As shown in FIG. 1, the autonomous navigation system 100 includes an Electronic Control Unit (ECU) 101, sensors 103, and a main controller 105. A person skilled in the art would understand that the autonomous navigation system 100 may also include any other units, not mentioned explicitly in the present disclosure. The sensors 103 are coupled to the main controller 105 and the ECU 101. The main controller 105 and the ECU 101 are coupled to each other. The ECU 101 may be used for validating odometer performance in the autonomous vehicle in real-time. In an embodiment, the sensors 103 may include, an odometer, and a Light Ranging and Detection (LIDAR) sensor. A person skilled in the art would understand that the sensors 103 may include any other sensors, not mentioned explicitly in the present disclosure. In an embodiment, the ECU 101 may initiate navigation of the autonomous vehicle through a planned path on receipt of a source input and a destination input on a map. In an example, the map is a three dimensional map. The ECU 101 detects a first landmark at a first distance and a first viewing angle and a second landmark at a second distance and second viewing angle from a current position of the autonomous vehicle on the planned path based on camera observation. Further, the ECU 101 identifies a first stored record corresponding to the first landmark based on a first distance match and a second stored record corresponding to the second landmark based on a second distance match. The ECU 101 determines the current position of the autonomous vehicle on the map based on the first distance, the first viewing angle, the second distance, the second viewing angle, the first stored record and the second stored record. Thereafter, the ECU 101 determines a next consecutive position of the autonomous vehicle on the map, and validates reading of the odometer with distance covered by the autonomous vehicle measured between the current position and the consecutive position.

The ECU 101 may include at least one Central Processing Unit (CPU or processor) 111 and a memory 109 for storing instructions executable by the at least one processor 111. The processor 111 may include at least one data processor for executing program components for executing user or system-generated requests. The memory 109 is communicatively coupled to the processor 111. The ECU 101 further includes an Input/Output (I/O) interface 107. The I/O interface 107 is coupled with the processor 111 through which an input signal or/and an output signal is communicated.

Figure 2:
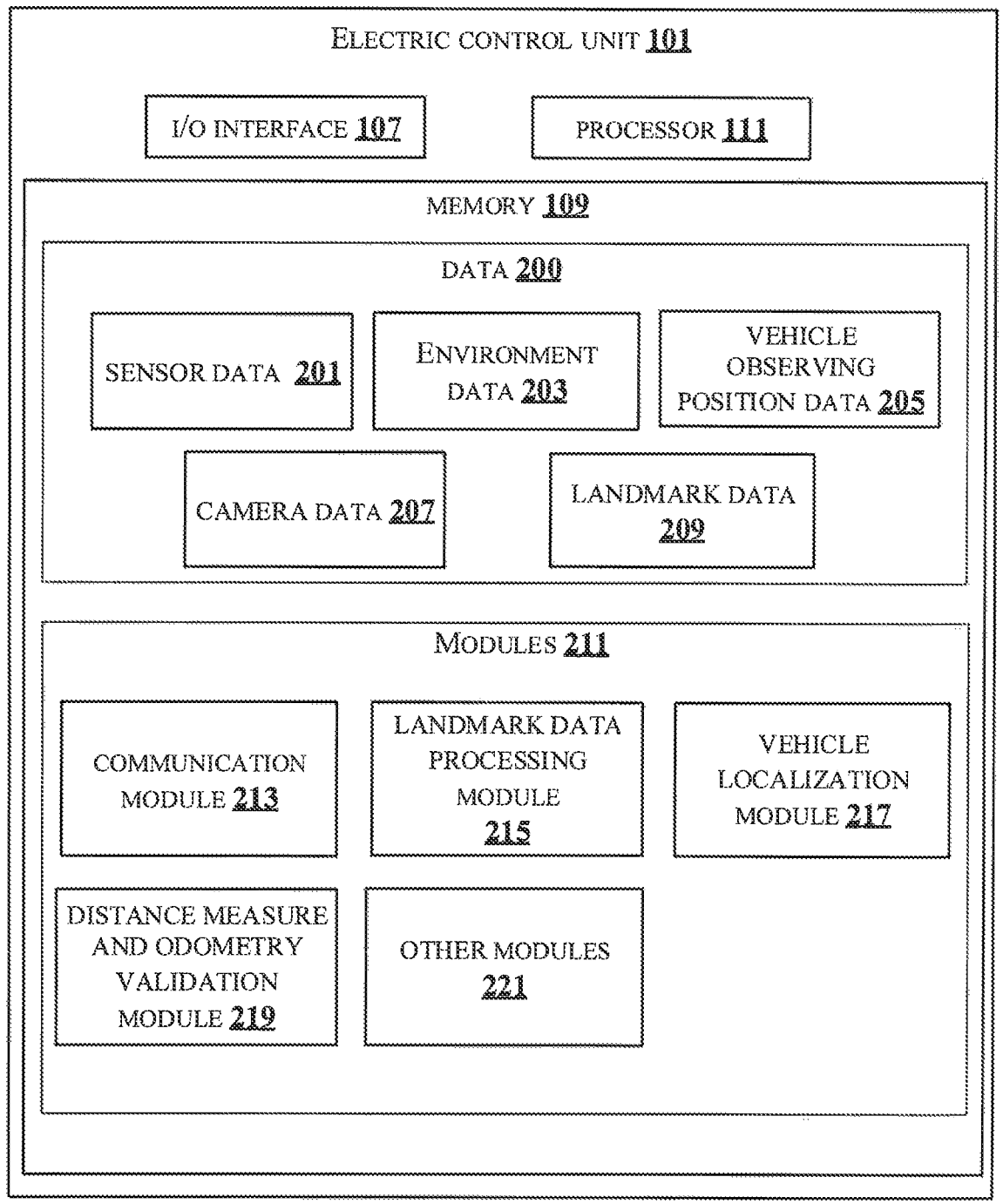
FIG. 2 illustrates embodiments of an Electronic Control Unit (ECU) configured for validating odometer performance in an autonomous vehicle in real-time, in accordance with some embodiments of the present disclosure.

FIG. 2 illustrates an embodiment of the ECU 101 configured for validating odometer performance in an autonomous vehicle in real-time, in accordance with some embodiments of the present disclosure.

The ECU 101 may include data 200 and one or more modules 211 which are described herein in detail. In an embodiment, data 200 may be stored within the memory 109. The data 200 may include, for example, sensor data 201, environment data 203, vehicle observing position data 205, camera data 207 and landmark data 209.

The sensor data 201 may include data from the sensors in the autonomous vehicle. Some examples of the sensors 103 include but are not limited to, an odometer, and a LIDAR sensor. The odometer is used for measuring and displaying distance travelled by the autonomous vehicle by sensing rotations of a wheel. The LIDAR sensor may provide a view of an environment surrounding the autonomous vehicle. A person skilled in the art would understand that any other sensors not mentioned explicitly for the autonomous vehicle, may also be used in the present disclosure.

The environment data 203 may include details related to a map of the environment. The map is a three-dimensional map which correlates surrounding static infrastructure and covers a wide span of area around the autonomous vehicle. For example, road boundaries surrounding the autonomous vehicle and the like.

The vehicle observing position data 205 may include position data of the autonomous vehicle captured during a trial run. The position data may include different known positions, preferably from center of a road, on all possible routes of the environment, from where camera observation is to be made.

The camera data 207 is the data observed and processed by a camera in the autonomous vehicle. Some examples of the camera data 207 include distance data and viewing angle data associated with landmarks and captured from different positions of the autonomous vehicle.

The landmark data 209 may store data associated with the landmarks on the planned path, including temporary data and temporary files, prior known landmarks, for example lamp posts, buildings, signboards, and the like.

In an embodiment, the data 200 in the memory 109 are processed by the one or more modules 211 present within the memory 109 of the ECU 101. In an embodiment, the one or more modules 211 may be implemented as dedicated units.

As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 111 for performing one or more functions of the ECU 101. The modules 211 when configured with the functionality defined in the present disclosure will result in a novel hardware.

In one implementation, the one or more modules 211 may include, but are not limited to, a communication module 213, a landmark data processing module 215, a vehicle localization module 217, and a distance measure and odometry validation module 219. The one or more modules 211 may also include other modules 221 to perform various miscellaneous functionalities of the ECU 101. In an embodiment, the other modules 221 may include a navigation initiator module, a path planning module, and a trajectory and velocity generation module.

The navigation initiator module (NIM) is a user interface to the autonomous navigation system 100. The user interface with the map will be displayed to a user. The user may provide a source input and a destination input on the map. The source input may be a current vehicle location and the destination input may be a desired location on the road. The user may either enter the details or provide touch inputs on the map. The navigation of the autonomous vehicle is initiated once the ECU 101 receives the source input and the destination input from the map.

The path planning module (PPM) is used to produce a base path for the navigation of the autonomous vehicle from the current vehicle position to the destination input. This is referred to as path planning. A global path is further planned for navigation and motion of the autonomous vehicle. The global path includes around 10 to 15 meters ahead of a global path point.

The trajectory and velocity generation module (TP&VGM) is used for generating a suitable trajectory plan is generated for the global path, based on current environment data and vehicle speed. The trajectory plan is provided to the NIM, for velocity generation. Based on the trajectory plan, the TP&VGM generates a realistic velocity based on a previous moment velocity and a projected velocity. While trajectory planning happens, based on current velocity of the autonomous vehicle and the global path ahead (by curvature data calculation), a better trajectory plan is received. The velocity generation happens in certain frequency, for example of 100 milliseconds and applied to wheel base of the autonomous vehicle. A next moment velocity is also observed for further realistic velocity calculation.

The communication module 213 may be used for communication between the ECU 101 and other units (not shown in figures) of the autonomous vehicle. In an embodiment, the other units may include, but are not limited to, the sensors 103, and the like. For example, the communication module 213 may receive the data from the odometer of the autonomous vehicle to determine distance travelled by the autonomous vehicle. The communication module 213 may receive the data from the LIDAR sensor.

The landmark data processing module (LDPM) 215 is used for processing landmark data that is initially collected by the autonomous vehicle during the trial run. One or more landmarks are placed beside the road or already exist. A known camera based landmark object detection method is run during this journey to get the record of observed distance and viewing angle associated with each landmark and corresponding position of the autonomous vehicle.

The vehicle localization module (VLM) 217 enables the autonomous vehicle to use a camera based location identification method by observing the one or more landmarks and fetching a previous observation data record from a known position of the autonomous vehicle. Two such stored records are analyzed to get the current position of the autonomous vehicle on the map.

The distance measure and odometry validation module (DM&OVM) 219 measures the distance travelled by the autonomous vehicle and hence validates the odometer. This is done by measuring consecutive time differed position data of the autonomous vehicle to calculate a shift. At the same time two time differed odometer reading is also received and same shift is calculated. The two shifts are compared to validate the odometer performance.

Figure 6:
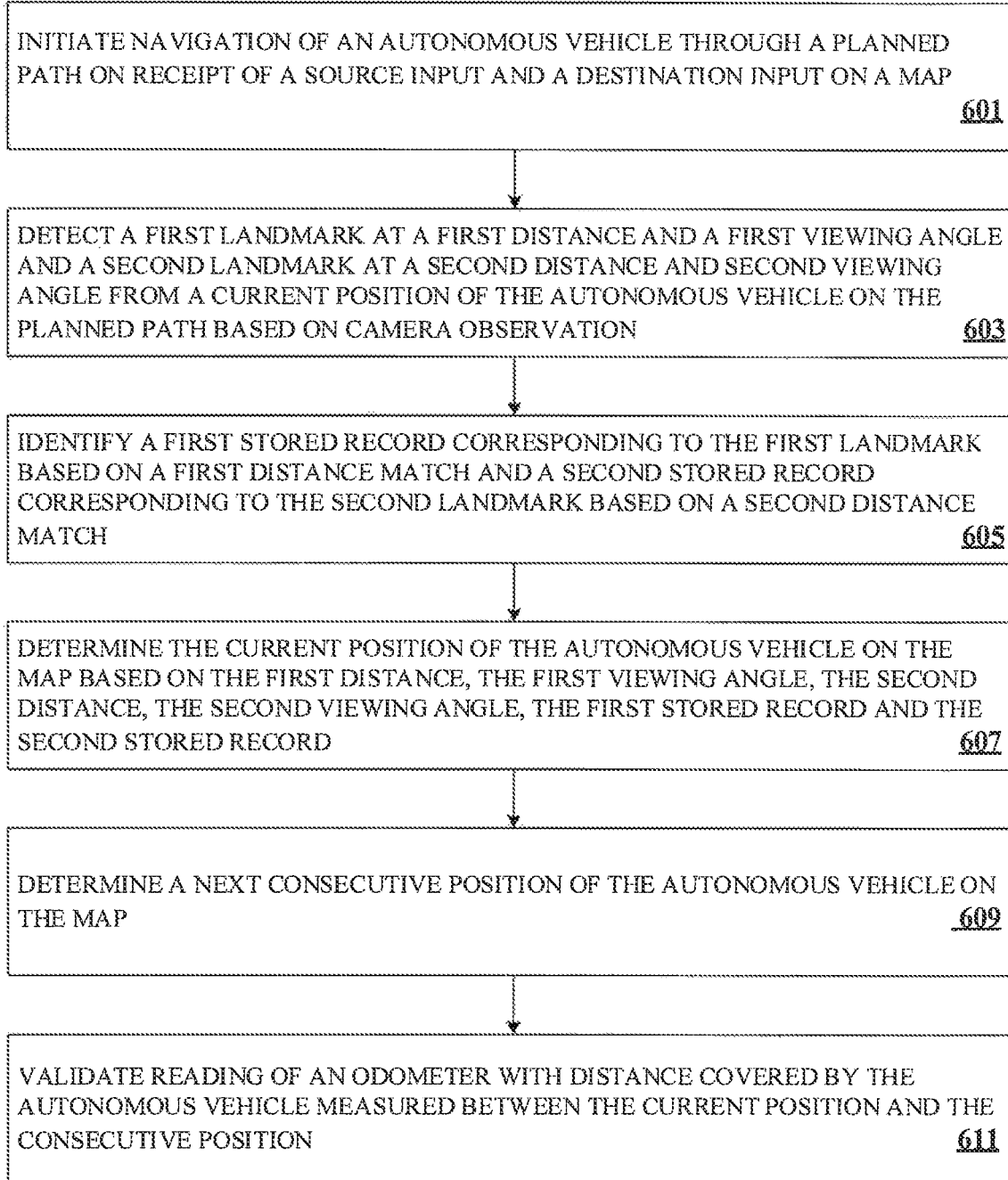
FIG. 6 illustrates a flowchart showing a method of validating odometer performance in an autonomous vehicle in real-time, in accordance with some embodiments of present disclosure.

FIG. 6 illustrates a flowchart of a method of validating odometer performance in an autonomous vehicle in real-time, in accordance with some embodiments of the present disclosure.

As illustrated in FIG. 6, the method 600 includes one or more blocks for validating odometer performance in the autonomous vehicle in real-time. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Initially, a database of stored records are populated, for example by the landmark data processing module 215. This is done by running the autonomous vehicle through one or more paths. One or more landmarks are placed beside the road or already exist beside the road. A known camera based landmark object detection method is run during this journey to get a stored record of observed distance and viewing angle associated with the landmark and corresponding position of the autonomous vehicle. As the autonomous vehicle is moved through known paths by manoeuvring, positions of the autonomous vehicle at each moment is known. At each such position, one or more positions, distance and viewing angle is determined by appropriate image processing methods and stored in association with the position data of the autonomous vehicle. The landmarks are positioned as part of infrastructure and hence position of the landmarks with respect to any map position and hence from position of the autonomous vehicle is known.

Figures 3, 4:
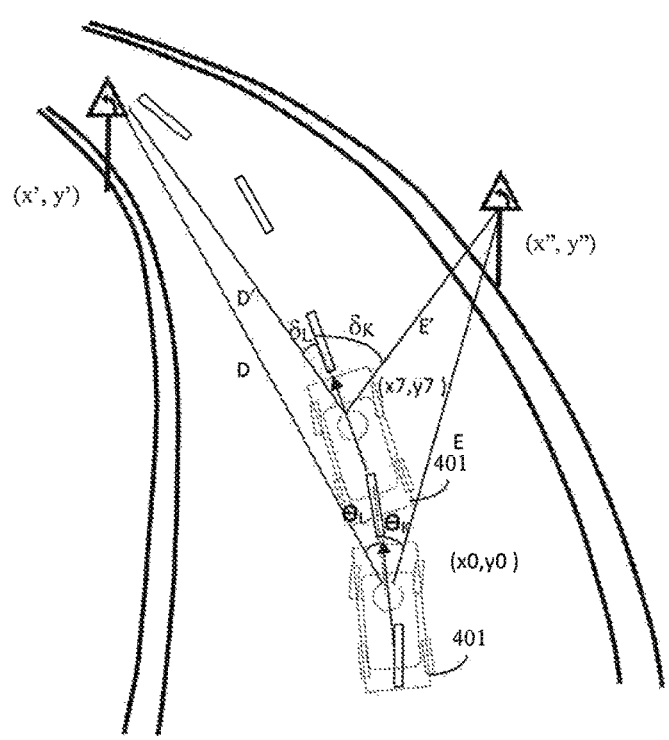
FIG. 3 illustrates a table corresponding to a stored record associated with a position of an autonomous vehicle, in accordance with some embodiments of the present disclosure.
FIG. 4 shows an exemplary representation for determining a stored record associated with a position of an autonomous vehicle, in accordance with some embodiments of the present disclosure.

An example of the stored record is illustrated in FIG. 3, in which for an (x, y) position of the autonomous vehicle, the (x, y) position of the first landmark, the distance of the first landmark from the autonomous vehicle, the viewing angle of the first landmark from the autonomous vehicle, as well as the (x, y) position of the second landmark, the distance of the second landmark from the autonomous vehicle, the viewing angle of the second landmark from the autonomous vehicle is noted as the stored record.

An exemplary representation for determining the stored record associated with a position of the autonomous vehicle is further illustrated in FIG. 4. In the FIG. 4, the autonomous vehicle 401 is passing through center of a lane and is currently at a known position of (x0, y0). From this position, two landmarks positioned at (x', y') & (x", y") are identified by a known image processing method, at D and E distances respectively and with $\Theta_L$ and $\Theta_K$ viewing angles with respect to the autonomous vehicle 401. Similarly (x7, y7) is another known position while the autonomous vehicle 401 passes through center of the lane. From this position, the same two landmarks positioned at (x', y') and (x", y") are identified by the known image processing method, at D' and E' distances respectively and with $\delta_L$ and $\delta_K$ viewing angles with respect to the autonomous vehicle 401. As the autonomous vehicle 401 is being maneuvered and tracked on the map for the current position by odometer reading, visual inspection, together with some more additional tools, orientation of the autonomous vehicle 401 with respect to the map is determined. So for example, viewing angle of a landmark with respect to map, from position (x0, y0) will be recorded as $(\Theta_L+\Theta o)$ and $(\Theta_K-\Theta o)$.

At block 601, the method 600 includes initiating navigation of the autonomous vehicle, by an electronic control unit (ECU), through a planned path on receipt of a source input and a destination input on a map. This step is initiated by the navigation initiation module, referred to in FIG. 2. A user interface with a map will be displayed to the user and the user can provide the source input and the destination input either by key entry or by touch input to initiate the navigation. The steps performed by the navigation initiation module are explained in detail in conjunction with FIG. 2, and is not explained herein for sake of brevity.

In some embodiments, a global path is planned for navigation of the autonomous vehicle, by the path planning module, referred to in FIG. 2. The steps performed by the path planning module are explained in detail in conjunction with FIG. 2, and is not explained herein for sake of brevity.

In some embodiments, a trajectory plan is generated for the global path based on environment data and speed data associated with the autonomous vehicle. This is performed by the trajectory and velocity generation module, referred to in FIG. 2. A velocity can further be generated for the autonomous vehicle based on the trajectory plan. The steps performed by the trajectory and velocity generation module are explained in detail in conjunction with FIG. 2, and is not explained herein for sake of brevity.

The following steps 603 to 609 explained below are performed by the vehicle localization module 217, referred to in FIG. 2. This is also referred to as localization and may be used only on a customized or adopted environment. Two such time different position measure which give distance covered by vehicle is compared with odometer reading to identify it's measurement accuracy.

At block 603, the method 600 includes detecting, by the ECU, a first landmark at a first distance and a first viewing angle and a second landmark at a second distance and second viewing angle from a current position of the autonomous vehicle on the planned path based on camera observation. The autonomous vehicle localizes itself on the map based on detected data.

At block 605, the method 600 includes identifying, by the ECU, a first stored record corresponding to the first landmark based on a first distance match and a second stored record corresponding to the second landmark based on a second distance match.

At block 607, the method 600 includes determining, by the ECU, the current position of the autonomous vehicle on the map based on the first distance, the first viewing angle, the second distance, the second viewing angle, the first stored record and the second stored record.

At block 609, the method 600 includes determining, by the ECU, a next consecutive position of the autonomous vehicle on the map. The current position and the next consecutive position of the autonomous vehicle is used to determine a distance covered by the autonomous vehicle. The steps performed for 603 to 609 can be explained with an example below.

Figure 5:
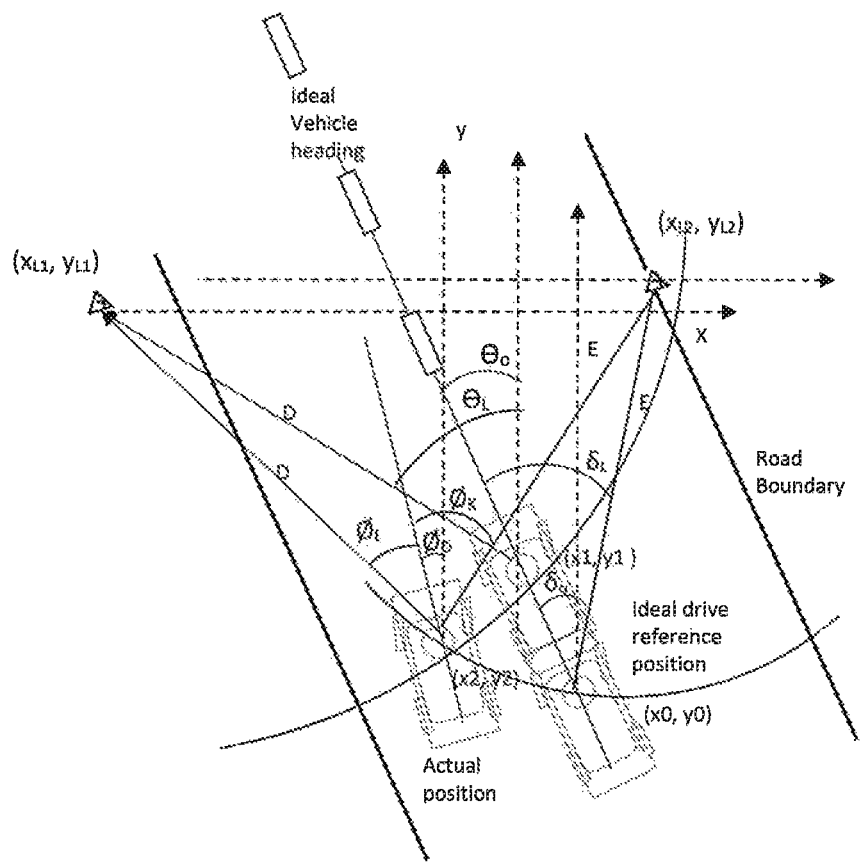
FIG. 5 shows an exemplary representation for determining a current position of an autonomous vehicle on a map, in accordance with some embodiments of the present disclosure.

FIG. 5 shows an exemplary representation for determining the current position of the autonomous vehicle on the map, in accordance with some embodiments of the present disclosure. In FIG. 5, an actual position (x2, y2) of the autonomous vehicle is shown, while navigating through a path. From this position, based on camera observation, two landmark $(x_{L1}, y_{L1})$ and $(x_{L2}, y_{L2})$ is identified at distance D with viewing angle $Ø_L$ and distance E with viewing angle $Ø_K$ with respect to autonomous vehicle. Now for distance D observation, a corresponding ideal journey position (x1,y1) with viewing angle $\Theta_L$ with respect to the map (navigation map) is identified from the stored record. Similarly for distance E observation, a corresponding ideal journey position (x0,y0) with viewing angle $\delta_L$ with respect to navigation map is identified from the stored record. Using the data in the below calculation, the current position (x2, y2) of the autonomous vehicle is determined.

The following are the known parameters used in the calculation of the current position (x2, y2) of the autonomous vehicle:

From current position of autonomous vehicle, the first landmark is at position $(x_{L1}, y_{L1})$ having distance D and viewing angle $Ø=(Ø_L+Øo)$ with respect to map;

From current position of autonomous vehicle, to the second landmark is at position $(x_{L2}, y_{L2})$ having distance E and viewing angle $\delta=(\delta_L+\delta o)$ with respect to map;

Record position (x1, y1) from where the first landmark was visible at distance D;

Record position (x0, y0) from where the second landmark was visible at distance E;

The equation is derived as below, $$D^*\cos(Ø_L+Øo)=(y2-y1+\cos(\Theta_L-\Theta o)) \quad \text{eq 1}$$

$$D^*\sin(Ø_L+Øo)=(x2-x1+\sin(\Theta_L-\Theta o)) \quad \text{eq 2}$$

$$E^*\cos(Ø_K-Øo)=(y2-y0+\cos(\delta_L-\delta o)) \quad \text{eq 3}$$

$$E^*\sin(Ø_K-Øo)=(x2-x0+\sin(\delta_L-0\delta o)) \quad \text{eq 4}$$

From eq 1 and eq 3 replacing x2, $$D^*\cos(Ø_L+Øo)-E^*\cos(Ø_K-Øo)=y0-y1+\cos(\Theta_L-\Theta o)-\cos(\delta_L-\delta o);$$

or $$D^*\cos(Ø_L-Øo)-E^*\cos(Ø_K+Øo)=K;$$

Similarly eq 2 and eq 4 replacing y2

$$D^*\sin(Ø_L+Øo)-E^*\sin(Ø_K-Øo)=M;$$

Now, $$E^*\cos(Ø_K-Øo)-D^*\cos(Ø_L+Øo)=(x_{L1}-x_{L1})=P$$

$$E^*\sin(Ø_K-Øo)-D^*\sin(Ø_L+Øo)=(y_{L1}-y_{L1})=Q$$

Hence, $$E^*(\cos(Ø_K-Øo)-\cos(Ø_K+Øo))=K-P$$

$$(\cos Ø_K^*\cos Øo - \sin Ø_K^*\sin Øo)-(\cos Ø_K^*\cos Øo+\sin Ø_K^*\sin Øo)=(K-P)/E$$

$$\sin Ø_K^*\sin Øo=(P-K)/2E$$

$$\sin Øo=(P-K)/(2E^*\sin Ø_K)$$

$$Øo=\sin-1((P-K)/(\sin Ø_K^*2E))$$

Now, putting Øo in eq 1 and eq 2, the current position of the autonomous vehicle (x2, y2) can be determined.

At block 611, the method 600 includes validating reading of the odometer with the distance covered by the autonomous vehicle measured between the current position and the consecutive position. This step is performed by the distance measure and odometry validation module 219.

In some embodiments, based on the validation, the ECU may decide whether to continue navigation or stop moving. If there is a degradation in performance of the odometer, the ECU is asked to gradually stop the vehicle on a side of road.

Figure 7:
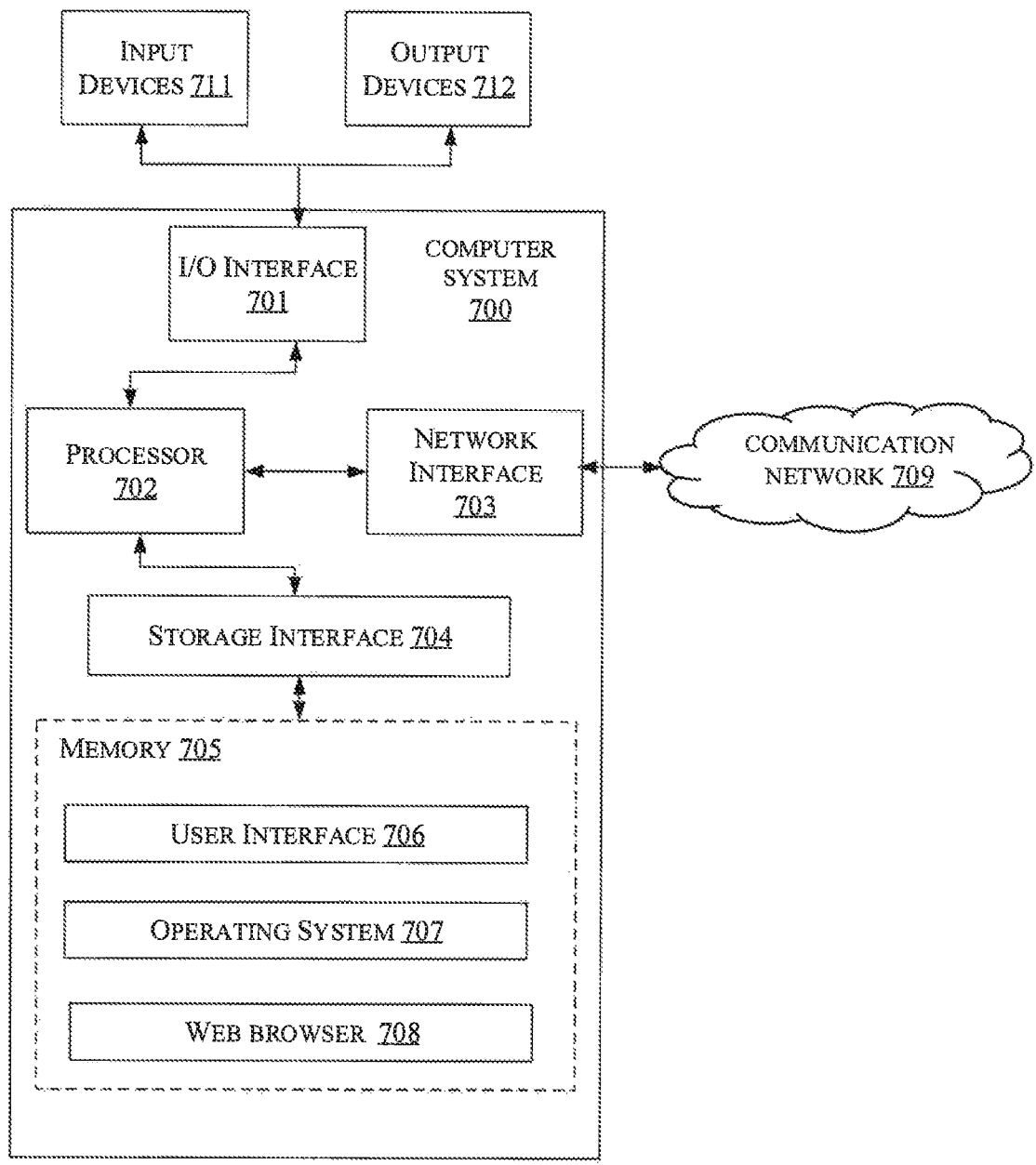
FIG. 7 illustrates a block diagram of an exemplary computer system for implementing embodiments consistent with the present disclosure.

FIG. 7 is a block diagram of an exemplary computer system for implementing embodiments consistent with the present disclosure.

In some embodiments, FIG. 7 illustrates a block diagram of an exemplary computer system 700 for implementing embodiments consistent with the present invention. In some embodiments, the computer system 700 can be the autonomous navigation system 100 that is used for validating odometer performance in an autonomous vehicle in real-time. The computer system 700 may include a central processing unit (CPU or processor) 702. The processor 702 may include at least one data processor for executing program components for executing user or system-generated business processes. A user may include a person, a person using a device such as such as those included in this invention, or such a device itself. The processor 702 may include specialized processing units such as integrated system (bus) controllers, memory management control units, floating point units, graphics processing units, digital signal processing units, etc.

The processor 702 may be disposed in communication with input devices 711 and output devices 712 via I/O interface 701. The I/O interface 701 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (for example, Code-Division Multiple Access (CDMA), High-Speed Packet Access (HSPA+), Global System For Mobile Communications (GSM), Long-Term Evolution (LTE), WiMax, or the like), etc.

Using the I/O interface 701, computer system 700 may communicate with input devices 711 and output devices 712.

In some embodiments, the processor 702 may be disposed in communication with a communication network 709 via a network interface 703. The network interface 703 may communicate with the communication network 709. The network interface 703 may employ connection protocols including, without limitation, direct connect, Ethernet (for example, twisted pair 10/100/1000 Base T), Transmission Control Protocol/Internet Protocol (TCP/IP), token ring, IEEE 802.11a/b/g/n/x, etc. Using the network interface 703 and the communication network 709, the computer system 700 may communicate with other modules. The communication network 709 can be implemented as one of the different types of networks, such as intranet or Local Area Network (LAN), Closed Area Network (CAN) and such within the autonomous vehicle. The communication network 709 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 709 may include a variety of network devices, including routers, bridges, servers, computing devices, storage devices, etc. In some embodiments, the processor 702 may be disposed in communication with a memory 705 (for example, RAM, ROM, etc. not shown in FIG. 7) via a storage interface 704. The storage interface 704 may connect to memory 705 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, a user interface 706, an operating system 707, a web browser 708 etc. In some embodiments, the computer system 700 may store user/application data, such as the data, variables, records, etc. as described in this invention. Such databases may be implemented as fault-tolerant, relational, scalable, secure databases such as Oracle or Sybase.

The operating system 707 may facilitate resource management and operation of the computer system 700. Examples of operating systems include, without limitation, APPLE® MACINTOSH® OS X®, UNIX®, UNIX-like system distributions (for example, BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The user interface 706 may facilitate display, execution, interaction, manipulation, or operation of program components through textual or graphical facilities. For example, user interfaces may provide computer interaction interface elements on a display system operatively connected to the computer system 700, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (for example, Aero, Metro, etc.), web interface libraries (for example, ActiveX®, Java®, Javascript®, AJAX, HTML, Adobe® Flash®, etc.), or the like.

In some embodiments, the computer system 700 may implement the web browser 708 stored program components. The web browser 708 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX, DHTML, ADOBE® FLASH®, JAVASCRIPT®, JAVA®, Application Programming Interfaces (APIs), etc. In some embodiments, the computer system 700 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 700 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

An embodiment of the present disclosure uses a parallel method to identify location of a moving autonomous vehicle, without using odometer reading. This may be utilized in a specialized environment with one or more landmarks. However, such a camera and landmark based method is an add on to monitor and validate the odometer used in the autonomous vehicle. Further, due to usage of landmarks of known patterns, it is identifiable with less processing and high accuracy.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of validating odometer performance in an autonomous vehicle in real-time, the method comprising:
    initiating, by an electronic control unit (ECU), navigation of the autonomous vehicle through a planned path on receipt of a source input and a destination input on a map;
    detecting, by the ECU, a first landmark at a first distance and a first viewing angle and a second landmark at a second distance and second viewing angle from a current position of the autonomous vehicle on the planned path based on camera observation;
    identifying, by the ECU, a first stored record corresponding to the first landmark based on a first distance match and a second stored record corresponding to the second landmark based on a second distance match;
    determining, by the ECU, the current position of the autonomous vehicle on the map based on the first distance, the first viewing angle, the second distance, the second viewing angle, the first stored record and the second stored record;
    determining, by the ECU, a next consecutive position of the autonomous vehicle on the map; and
    validating, by the ECU, reading of the odometer with distance covered by the autonomous vehicle measured between the current position and the consecutive position.

2. The method as claimed in claim 1 and further comprising identifying a stored record by:
    identifying one or more landmarks on a path by manually running the autonomous vehicle through the path;
    determining distance data, viewing angle data, and position data associated with the one or more landmarks on the path of the autonomous vehicle; and
    storing the distance data, the viewing angle data, and the position data associated with the one or more landmarks with respect to position of the autonomous vehicle as the stored record.

3. The method as claimed in claim 2, wherein the distance data, the viewing angle data, associated with the one or more landmarks are identified using an image processing method, and wherein the position data associated with the one or more landmarks are pre-defined.

4. The method as claimed in claim 1 and further comprising:
    planning a global path for navigation of the autonomous vehicle.

5. The method as claimed in claim 4 and further comprising:
    generating a trajectory plan for the global path based on environment data and speed data associated with the autonomous vehicle; and
    generating a velocity for the autonomous vehicle based on the trajectory plan.

6. The method as claimed in claim 1, wherein the map is a three-dimensional map.

7. An Electronic Control Unit (ECU) of an autonomous vehicle for validating odometer performance in real-time, comprising:
    a processor; and
    a memory communicatively coupled to the processor, wherein the memory stores processor instructions, which, on execution, causes the processor to:
        initiate navigation of the autonomous vehicle through a planned path on receipt of a source input and a destination input on a map;
        detect a first landmark at a first distance and a first viewing angle and a second landmark at a second distance and second viewing angle from a current position of the autonomous vehicle on the planned path based on camera observation;
        identify a first stored record corresponding to the first landmark based on a first distance match and a second stored record corresponding to the second landmark based on a second distance match;
        determine the current position of the autonomous vehicle on the map based on the first distance, the first viewing angle, the second distance, the second viewing angle, the first stored record and the second stored record;
        determine a next consecutive position of the autonomous vehicle on the map; and
        validate reading of the odometer with distance covered by the autonomous vehicle measured between the current position and the consecutive position.

8. The ECU as claimed in claim 7, wherein the processor instructions causes the processor to identify a stored record by:
    identifying one or more landmarks on a path by manually running the autonomous vehicle through the path;
    determining distance data, viewing angle data, and position data associated with the one or more landmarks on the path of the autonomous vehicle; and
    storing the distance data, the viewing angle data, and the position data associated with the one or more landmarks with respect to position of the autonomous vehicle as the stored record.

9. The ECU as claimed in claim 8, wherein the distance data, the viewing angle data, associated with the one or more landmarks are identified using an image processing method, and wherein the position data associated with the one or more landmarks are pre-defined.

10. The ECU as claimed in claim 7, and wherein the processor instructions causes the processor to:
 plan a global path for navigation of the autonomous vehicle.

11. The ECU as claimed in claim 10, and wherein the processor instructions causes the processor to:
 generate a trajectory plan for the global path based on environment data and speed data associated with the autonomous vehicle; and
 generate a velocity for the autonomous vehicle based on the trajectory plan.

12. The ECU as claimed in claim 7, wherein the map is a three-dimensional map.

13. A non-transitory computer readable medium including instructions stored thereon that when processed by at least one processor causes an Electronic Control Unit (ECU) associated with an autonomous vehicle to perform operations comprising:

initiating navigation of the autonomous vehicle through a planned path on receipt of a source input and a destination input on a map;

detecting a first landmark at a first distance and a first viewing angle and a second landmark at a second distance and second viewing angle from a current position of the autonomous vehicle on the planned path based on camera observation;

identifying a first stored record corresponding to the first landmark based on a first distance match and a second stored record corresponding to the second landmark based on a second distance match;

determining the current position of the autonomous vehicle on the map based on the first distance, the first viewing angle, the second distance, the second viewing angle, the first stored record and the second stored record;

determining a next consecutive position of the autonomous vehicle on the map; and validating reading of the odometer with distance covered by the autonomous vehicle measured between the current position and the consecutive position.

\* \* \* \* \*